United States Patent
Nishio

(10) Patent No.: US 6,812,603 B2
(45) Date of Patent: Nov. 2, 2004

(54) FLAT MOTOR

(75) Inventor: Mitsumasa Nishio, Shizuoka-ken (JP)

(73) Assignee: Victor Company of Japan, Ltd. (JP)

( * ) Notice: Subject to any disclaimer, the term of this patent is extended or adjusted under 35 U.S.C. 154(b) by 4 days.

(21) Appl. No.: 10/602,677

(22) Filed: Jun. 25, 2003

(65) Prior Publication Data

US 2004/0051407 A1 Mar. 18, 2004

(30) Foreign Application Priority Data

Jun. 28, 2002 (JP) ........................................ 2002-190118

(51) Int. Cl.$^7$ ................................................ H02K 7/14
(52) U.S. Cl. .................. 310/67 R; 310/254; 360/98.07; 360/99.08; 360/99.04
(58) Field of Search .............................. 310/67 R, 254, 310/258, 259, 268, 90, 156.32, 40 MM; 360/98.07, 99.08, 99.04; 29/596–598

(56) References Cited

U.S. PATENT DOCUMENTS

| | | | | |
|---|---|---|---|---|
| 4,594,524 A | * | 6/1986 | Sudo | ........................ 310/68 R |
| 5,446,325 A | * | 8/1995 | Iwabuchi | .................. 310/67 R |
| 5,793,135 A | * | 8/1998 | Suzuki et al. | ................. 310/90 |

FOREIGN PATENT DOCUMENTS

JP 6-11163 2/1994

* cited by examiner

*Primary Examiner*—Tran Nguyen
*Assistant Examiner*—Leda T. Pham
(74) *Attorney, Agent, or Firm*—Connolly Bove Lodge & Hutz LLP

(57) ABSTRACT

A flat motor is composed of a rotor 1 provided with a driving magnet 3 in a ring shape and a shaft 8, and a stator 5. The stator 1 is composed of a stator yoke 6 provided with a bearing mounting section 12 for mounting a bearing 10 for holding the rotor 1 and a driving coil mounting section 13 for mounting a plurality of driving coils 4 disposed in conjugating with the outer side of the bearing mounting section 12. The plurality of driving coils 4 is disposed in a concentric circle with facing towards the driving magnet 3. The bearing mounting section 12 is formed flat in a circular shape with centering the shaft 8. The driving coil mounting section 13 is a part of surface of approximately a circular cone shape having a vertex on the shaft 8 and is in a shape of inclining towards a direction away from the rotor 1 in accordance with being far away from the shaft 8 and formed with a pleat by bending the stator yoke 6 in a conjugating section 14 between the bearing mounting section 12 and the driving coil mounting section 13.

1 Claim, 7 Drawing Sheets

FLAT MOTOR

BACKGROUND OF THE INVENTION

1. Field of the Invention

The present invention relates to a flat motor that is so called an axial gap type flat motor in which a driving magnet faces toward a driving coil in the plane, particularly, relates to a spindle motor for flexible disc drive (FDD) that is essential to be thinner.

2. Description of the Related Art

A so-called axial gap type flat motor in which a driving magnet and a driving coil is constituted to be faced toward with each other in the plane is utilized for various equipment such as an FDD.

With referring to FIGS. 9(a), 9(b) and 10, a conventional flat motor for FDD is explained.

FIGS. 9(a) and 9(b) are cross-sectional views of a flat motor according to the prior art.

FIG. 10 is an enlarged fragmentary cross-sectional view of the flat motor shown in FIG. 9(a).

In FIGS. 9(a) and 10, a flat motor is composed of a rotor 100 that is formed by a soft magnetic material and a stator 50. The rotor 100 is further composed of a rotor yoke 20 and a ring-shaped driving magnet 30 that is adhered on the rotor yoke 20. A lower surface of the ring-shaped driving magnet 30 is magnetized with multipolar driving magnetic poles.

On the other hand, the stator 50 that is disposed under the rotor 100 is constituted by a plurality of ring-shaped driving coils 40, which is adhered in a ring shape on a plane stator yoke 60 that is to be a part of magnetic circuit and formed by a soft magnetic material.

Further, a shaft 80 to be an axis of revolution is installed in the rotor 100. The shaft 80 is held in the center of the stator 50 by way of a bearing 70 to rotate freely.

A slight gap "d1" is provided between the ring-shaped driving coil 40 and the ring-shaped driving magnet 30 to eliminate interference between them while the rotor 100 is rotating.

The rotor 100 rotates by rotational driving force that is generated by interaction between a magnetic field caused by the multipolar driving magnetic poles and rotational magnetic field caused by applying predetermined electric current to the ring-shaped driving coil 40.

Recently, a spindle motor for FDD is strongly required to be smaller in size and lighter in weight. Consequently, a rare-earth magnet having strong suction power is utilized for a ring-shaped driving magnet in order to increase operational efficiency while a thickness of motor is made thinner.

The stator yoke 60 is strongly drawn by the ring-shaped driving magnet 30 because of strong suction power, and resulted in deforming its shape such that the stator yoke 60 approaches to the ring-shaped driving magnet 30. Consequently, the gap "d1" between the ring-shaped driving magnet 30 and the ring-shaped driving coil 40 is narrowing in accordance with being toward the outer circumference of the stator yoke 60.

The Japanese Patent Application Laid-open Publications No. 6-11163/1994 discloses a structure of the stator yoke 60. As shown in FIG. 9(b), the structure is such that the stator yoke 60 is bent toward the opposite direction to the rotor 100 in accordance with being away from the axis of revolution when assembled.

The shape of the stator yoke 60 is, as shown in FIG. 9(a), formed like a saucer to maintain the gape "d1" between the ring-shaped driving magnet 30 and the ring-shaped driving coil 40 to be proper distance when the stator 50 is assembled with the rotor 100.

Generally, rotational torque increases in accordance with narrowing a gap between a driving magnet and a driving coil because magnetic flux generated by the driving magnet effectively links with the driving coil. Consequently, a motor is led to have higher efficiency, and the motor can be made thinner. However, in the case of the aforementioned stator yoke formed in a shape of saucer, deformation of the stator yoke caused by the strong suction power that acts between the driving magnet and the stator yoke is not uniform. Consequently, there existed a wider gap and a narrower gap between the driving coil and the stator yoke in the radial direction.

More specifically, the stator yoke approaches to the driving coil and the gap between them becomes narrower in accordance with the direction from the driving coil towards a spindle shaft. On the contrary, the stator yoke is deformed such that the gap between the driving magnet and the driving coil gradually increases in accordance with the direction towards the outer circumference.

Accordingly, there existed a restriction for the gap "d1" to be made narrower and resulted in a problem such that thinning the motor further more is hardly conducted.

Further, there existed another problem such that motor characteristics change in accordance with elapsed time and resulted in less reliability. Because, the stator yoke is always strained by the strong suction power and deformed gradually, and further, a creep phenomenon that changes drastically by external thermal load occurs in the stator yoke. By the creep phenomenon, the gap between the driving magnet and the driving coil is narrowed and resulted in a further problem. In the worst case, the driving magnet and the driving coil interferes with each other and are possibly damaged while revolving.

SUMMARY OF THE INVENTION

Accordingly, in consideration of the above-mentioned problems of the prior art, an object of the present invention is to provide a flat motor, which can be thinned more and has less change of characteristic by time elapsed and is high in reliability.

In order to achieve the above object, the present invention provides, according to an aspect thereof, a flat motor comprising a rotor composed of an axis and a driving magnet in a ring shape having multipolar driving magnetic poles; and a stator yoke composed of a plane section for mounting a bearing for holding the rotor to rotate freely with centering the axis and another plane section for mounting a plurality of driving coils disposed in a concentric circle with facing towards the driving magnet, wherein the other plane section is disposed in conjugating with the outer side of the plane section, the flat motor is further characterized in that the plane section is formed flat in a circular shape with centering the axis, and the other plane section is a part of surface of approximately a circular cone shape having a vertex on the axis and is in a shape of inclining towards a direction away from the rotor in accordance with being far away from the axis and formed with a pleat by bending the stator yoke in a conjugating section between the plane section and the other plane section.

Other object and further features of the present invention will be apparent from the following detailed description when read in conjunction with the accompanying drawings.

DETAILED DESCRIPTION OF THE PREFERRED EMBODIMENTS

Embodiment

Figure 1:
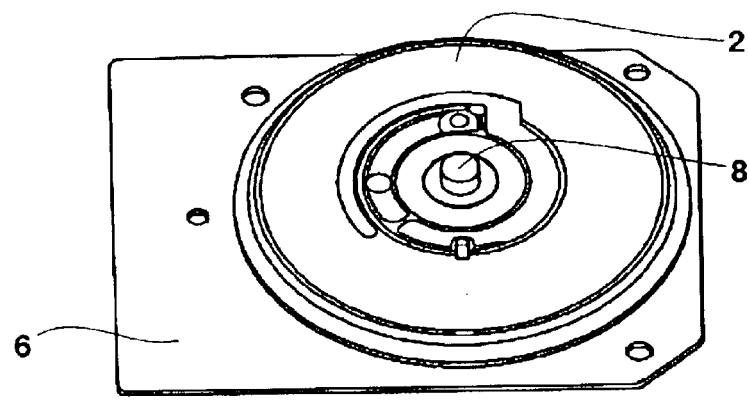
FIG. 1 is a perspective view of a flat motor according to an embodiment of the present invention.

FIG. 1 is a perspective view of a flat motor according to an embodiment of the present invention.

Figure 2:
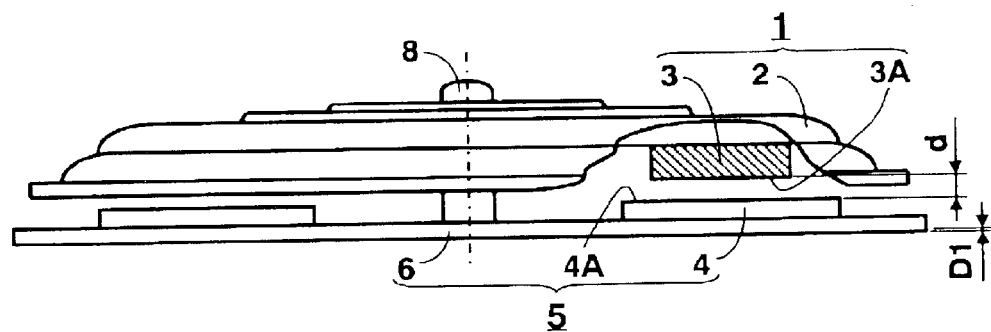
FIG. 2 is a fragmentary cross sectional view of the flat motor shown in FIG. 1.

FIG. 2 is a fragmentary cross sectional view of the flat motor shown in FIG. 1.

Figure 3:
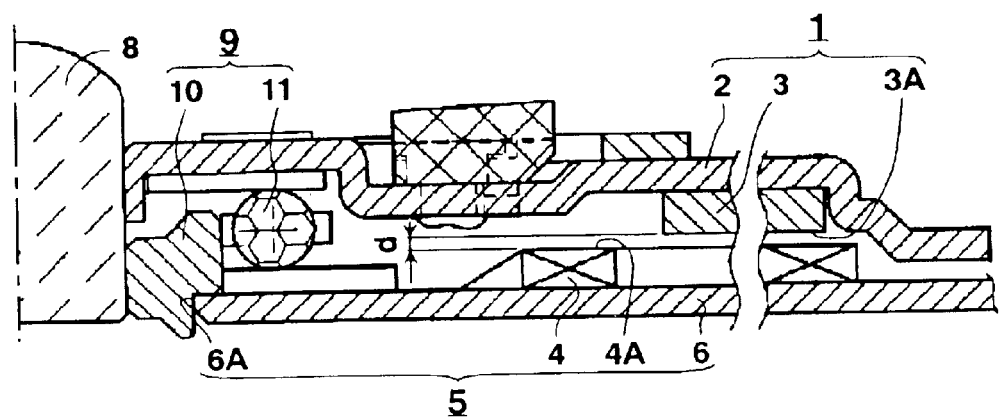
FIG. 3 is an enlarged fragmentary cross-sectional view of the flat motor shown in FIG. 1.

FIG. 3 is an enlarged fragmentary cross-sectional view of the flat motor shown in FIG. 1.

Figures 4A, 4B:
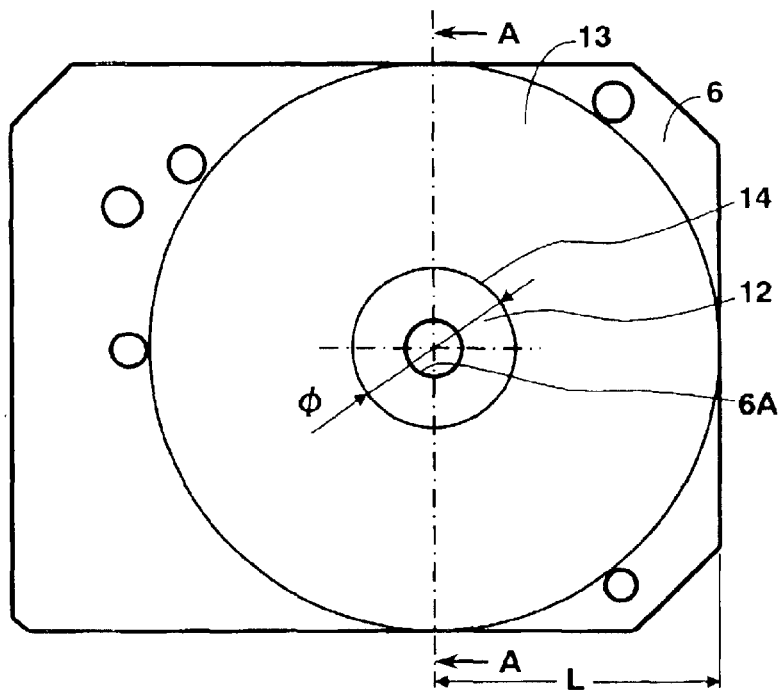
FIG. 4(a) is a plan view of a stator yoke of a flat motor according to the embodiment of the present invention.
FIG. 4(b) is a cross sectional view of the stator yoke taken substantially along line A—A in FIG. 4(a).

FIG. 4(a) is a plan view of a stator yoke of a flat motor according to the embodiment of the present invention.

FIG. 4(b) is a cross sectional view of the stator yoke taken substantially along line A—A in FIG. 4(a).

Figures 5A, 5B:
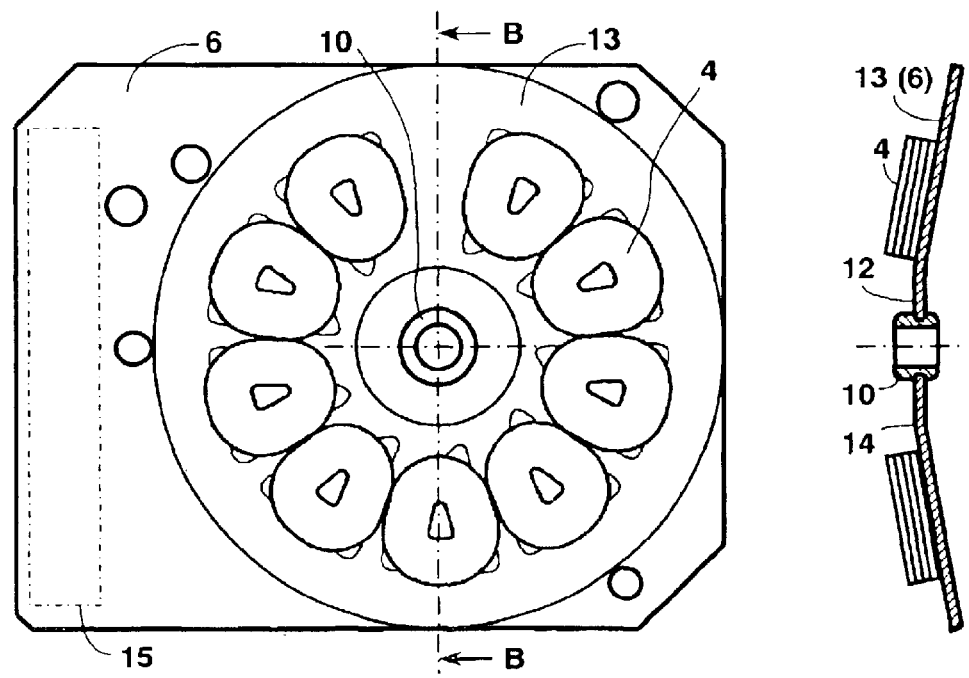
FIG. 5(a) is a plan view of the stator yoke shown in FIG. 4(a) mounted with some other component parts.
FIG. 5(b) is a cross sectional view of the stator yoke taken substantially along line B—B of FIG. 5(a).

FIG. 5(a) is a plan view of the stator yoke shown in FIG. 4(a) mounted with some other component parts.

FIG. 5(b) is a cross sectional view of the stator yoke taken substantially along line B—B of FIG. 5(a).

In FIGS. 1 through 3, a flat motor is composed of a rotor 1 and a stator 5. The rotor 1 is further composed of a rotor yoke 2 made by a soft magnetic material and a driving magnet 3 in a ring shape that is mounted on the rotor yoke 2 by magnetic suction power of the driving magnet 3. A lower surface 3A of the driving magnet 3 being towards the stator 5 is magnetized with multipolar driving magnetic poles.

Further, a shaft 8 to be an axis of revolution is installed in the stator 5.

On the other hand, the stator 5 that is disposed under the rotor 1 is constituted by a plurality of driving coils 4 in a ring shape, which is adhered in a ring shape on a stator yoke 6 that is approximately plane and to be a part of magnetic circuit and made by a soft magnetic material, wherein a symbol sign 4A is an upper surface of the driving coil 4.

Further, an opening 6A is provided at the center of the stator 5, and a sintered oilless bearing 10 is fixed in the opening 6A by a staking process.

Furthermore, the shaft 8 is held by way of a bearing unit 9 that is composed of the sintered oilless bearing 10 and a thrust ball bearing 11 to rotate freely.

FIGS. 5(a) and 5(b) are a plan view of the stator yoke 6 mounted with the driving coil 4 and the sintered oilless bearing 10 and its cross sectional view respectively. As shown in FIG. 5(a), the plurality of driving coils 4 is adhered on the stator yoke 6 in a concentric circle with centering the sintered oilless bearing 10.

Further, an electronic part not shown is soldered, for example, on a mounting section 15 for electronic part provided outside of the plurality of driving coils 4 on the stator yoke 6.

Furthermore, when assembling the rotor 1 and the stator 5 together, as shown in FIGS. 2 and 3, a slight gap "d" is provided for eliminating an interference between the driving coil 4 and the driving magnet 3 while the rotor 1 is rotating.

A shape of the stator yoke 6 is detailed next.

In FIGS. 4(a) through 5(b), the stator yoke 6 is formed as a printed circuit board composed of a silicon steel plate as a substrate. The stator yoke 6 is formed with a bearing mounting section 12 for staking the sintered oilless bearing 10 as a circular plane with centering an axis of revolution.

Further, a driving coil mounting section 13 for mounting the plurality of driving coils 4 is formed with surrounding the bearing mounting section 12, wherein a shape of the driving coil mounting section 14 is approximately a part of surface of a circular cone shape having a vertex on the axis of revolution and is formed with inclining towards a direction away from the rotor 1 in accordance with being far away from the axis.

Furthermore, a conjugating section 14 between the bearing mounting section 12 and the driving coil mounting section 13 is formed as a pleat by bending the stator yoke 6 for plastic deformation.

The conjugating section 14 is formed by bending as far as a bent line is clearly visible when viewing from the bent side even after the flat motor is assembled. In this embodiment, the conjugating section 14 is provided in a circle having a diameter φ of 15 mm with respect to the axis of revolution of the stator yoke 6. On the other hand, a length "L" between the axis of revolution of the stator yoke 6 and an outer circumference of the driving coil mounting section 13 is 23 mm.

When the flat motor is assembled by using the stator yoke 6 mentioned above, the driving magnet draws the stator yoke 6 and results in deforming the stator yoke 6 to be approached to the driving magnet 3. Consequently, the lower surface 3A of the driving magnet 3 and the upper surface 4A of the driving coil 4 that faces towards the lower surface 3A is disposed approximately in parallel to each other. This situation is shown in FIGS. 2 and 3.

In the conjugating section 14, flexural strength is extremely higher than that of the other sections, so that suction power by the driving magnet 3 towards the rotor 1 side is suppressed.

Further, the conjugation section 14 is provided in a position away from the axis of revolution and the position becomes a bearing for deformation of the driving coil mounting section 13 for mounting the driving coils 4. Therefore, deformation weight decreases in accordance with a distance from the bearing and results in increasing suction power being applied to the driving coil mounting section 13. Consequently, warpage "D1" shown in FIG. 2 becomes extremely smaller.

Furthermore, difference of the gap "d" between the driving magnet 3 and the driving coil 4 in a near side to and a far side from the axis of revolution becomes extremely smaller. Consequently, it is possible that the gap "d" is narrowed more and a thickness of flat motor is thinned further more.

A bent amount of the conjugating section 14 is designated arbitrarily by a relation between suction power of the driving magnet 3 and an optimum gap "d". In the case of this embodiment, a warpage "D0" shown in FIG. 4(b) is set to be within a range of 0.1 mm to 0.15 mm. The stator yoke 6 shown in FIGS. 4(b) and 5(b) is illustrated with exaggerating the deformation or the warpage "D0".

On the other hand, the bearing mounting section 12 for mounting the sintered oilless bearing 10 is formed flat, so that the sintered oilless bearing 10 enables to be mounted in an angle accurately.

The flat motor according to the embodiment of the present invention is evaluated with respect to [1] simulation and [2] reliability test. Results of the evaluation are detailed next.

[1] Simulation:

Between a conventional flat motor and the flat motor according to the embodiment of the present invention, difference of deformation of stator yoke by magnetic suction power is analyzed and evaluated by simulation based on the finite element method. Results of evaluation are shown in FIGS. 6(a) through 7(c). These drawings exhibit a deformation state of stator yoke caused by a rotor yoke and a driving magnet analyzed by the finite element method.

Figure 6A:
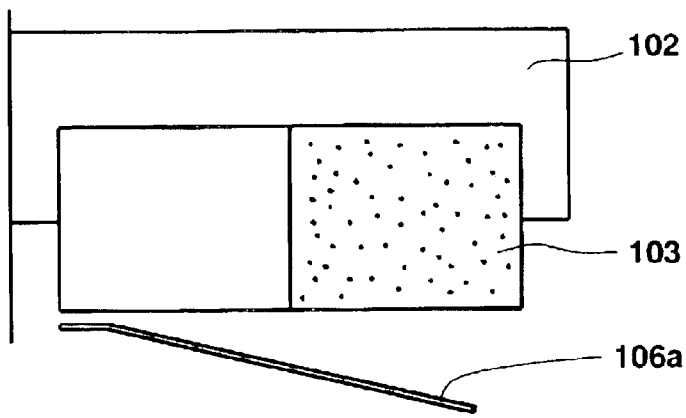
FIGS. 6(a) to 6(c) are simulation drawings exhibiting distribution of line of magnetic induction for explaining an effect of the flat motor based on the embodiment of the present invention.
Figure 6B:
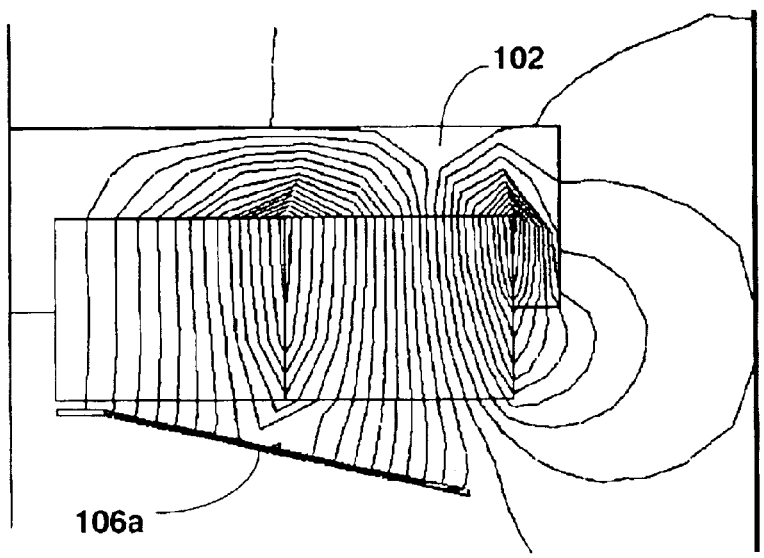
Figure 6C:
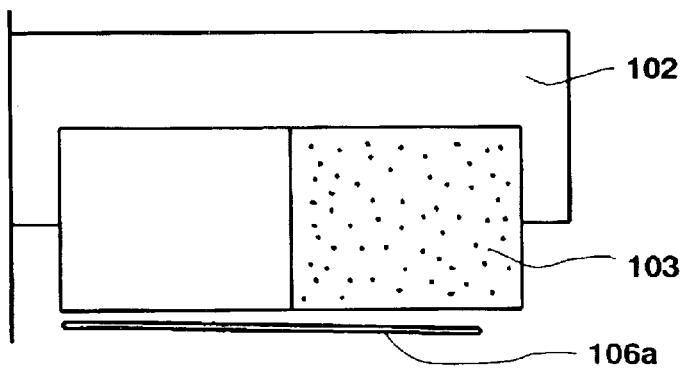

FIGS. 6(a) to 6(c) are simulation drawings exhibiting distribution of line of magnetic induction for explaining an effect of the flat motor based on the embodiment of the present invention.

Figure 7A:
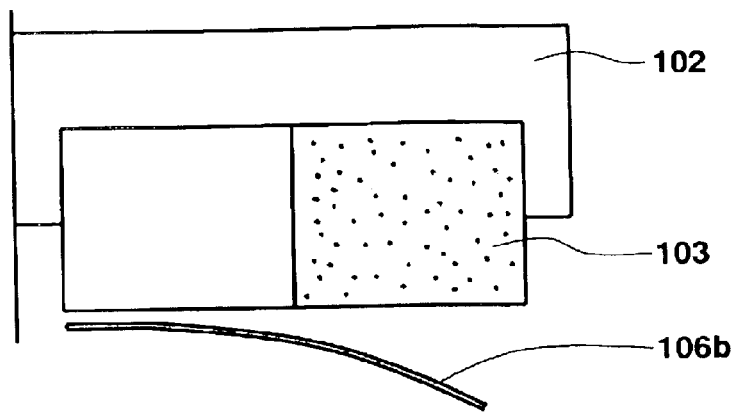
FIGS. 7(a) to 7(c) are simulation drawings exhibiting distribution of line of magnetic induction for explaining an effect of a flat motor based on the prior art.
Figure 7B:
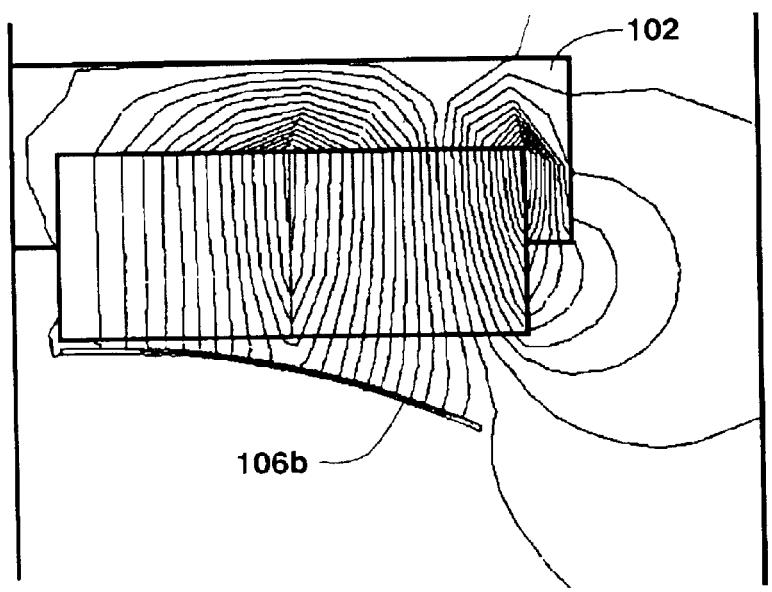
Figure 7C:
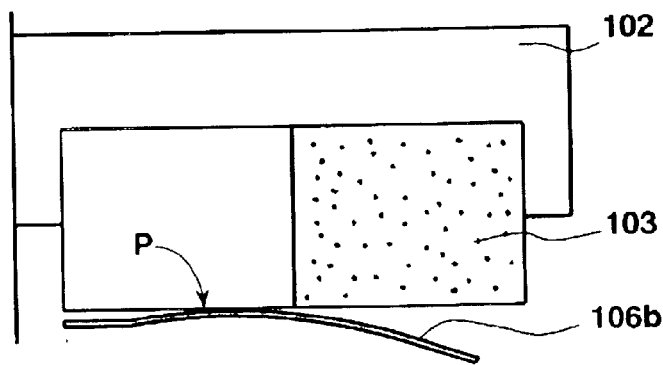

FIGS. 7(a) to 7(c) are simulation drawings exhibiting distribution of line of magnetic induction for explaining an effect of a flat motor based on the prior art.

In FIGS. 6(a) through 7(c), a rotor yoke 102 and a magnet 103 simulates and models the rotor yoke 2 or 20 and the driving magnet 3 or 30 respectively, and the magnet 103 is exhibited by a punctate area.

Further, a stator yoke 106a shown in FIGS. 6(a) to 6(c) and another stator yoke 106b shown in FIGS. 7(a) to 7(c) simulates and models the stator yoke 6 of the present invention and the stator yoke 60 of the prior art respectively.

The magnet 103, the rotor yoke 102, and the stator yoke 106a or 106b constitute a magnetic circuit. FIGS. 6(a) and 7(a) are a cross sectional view of a simulation model of the magnet 103 and the stator yoke 106a or 106b of the flat motor according to the present invention and the prior art respectively, wherein there is existed no magnetic suction power between the magnet 103 and the stator yoke 106a or 106b.

Further, FIGS. 6(b) and 7(b) show a simulation result of magnetic path of the stator yoke 106a or 106b constituting the magnetic circuit together with the magnet 103 of the flat motor according to the present invention and the prior art respectively.

Furthermore, FIGS. 6(c) and 7(c) show a situation of the stator yoke 106a or 106b how the stator yoke 106a or 106b is drawn by the magnet 103 that is calculated by using an equation (1) shown below.

$$Fs = \frac{1}{2\mu_0} \int_0^{2\pi} \int_{R1}^{R2} \{r \times B(r)^2\} dr d\theta \quad (1)$$

The equation (1) exhibits a suction power of the magnet 103, wherein Fs is a suction power of the magnet 103, R1 is an inner diameter of the magnet 103, R2 is an external diameter of the magnet 103, B is a function of flux density, θ is an angle, "r" is a distance from an axis of revolution, and $\mu_0$ is permeability.

As shown in FIG. 6(c), the stator yoke 106a based on the present invention is deformed and held approximately in parallel to the magnet 103.

On the contrary, as shown in FIG. 7(c), the stator yoke 106b based on the stator yoke 60 in the shape of saucer according to the prior art interferes with the magnet 103 at a point "P" that is close to the axis of revolution.

Further, a gap between the stator yoke 106b and the magnet 103 expands in the outer circumference area of the stator yoke 106b. Consequently, a uniform gap is not maintained.

As mentioned above, according to the simulation, it is found that the stator yoke 6 of the present invention maintains a shape in less warpage caused by suction power of the driving magnet 3 and results in providing a preferable performance as a motor.

[2] Reliability Test:

Deformation of the stator yoke 60 of the flat motor according to the prior art varies extremely by external heat load. On the contrary, in the case of the stator yoke 6 of the flat motor according to the present invention, such a variation of deformation is drastically suppressed.

In order to evaluate such a variation and change by elapsed time caused by heat load, a reliability test is conducted by following four items.

(a) leaving two hours in environment of normal temperature and humidity (25° C. and 60% RH)

(b) leaving two hours in environment of high temperature and humidity (60° C. and 90% RH)

(c) leaving two hours in environment of low temperature (0° C.)

(d) heat shock test: one sequential cycle of one hour at 65° C., 0.25 hour at 25° C., one hour at 45° C. and one hour at 25° C.

The above-mentioned reliability tests (a) through (d) are applied to the flat motor of the present invention and the flat motor of the prior art, and a variation ratio of warpage D1 and D2 of the stator yokes 6 and 60 before and after the reliability tests is studied. Results of the reliability test are shown in FIGS. 8(a) through 8(d), wherein D1 is the warpage of the stator yoke 6 shown in FIG. 2 according to the present invention and D2 is the warpage of the stator yoke 60 shown in FIG. 9(a) according to the prior art.

Figure 8A:
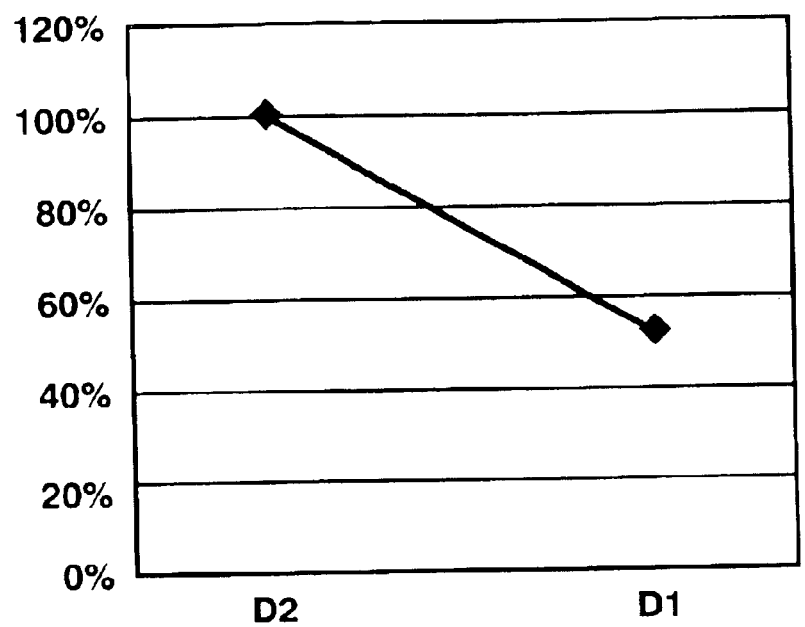
FIGS. 8(a) to 8(d) are graphs exhibiting effects of the flat motor according to the present invention.
Figure 9A:
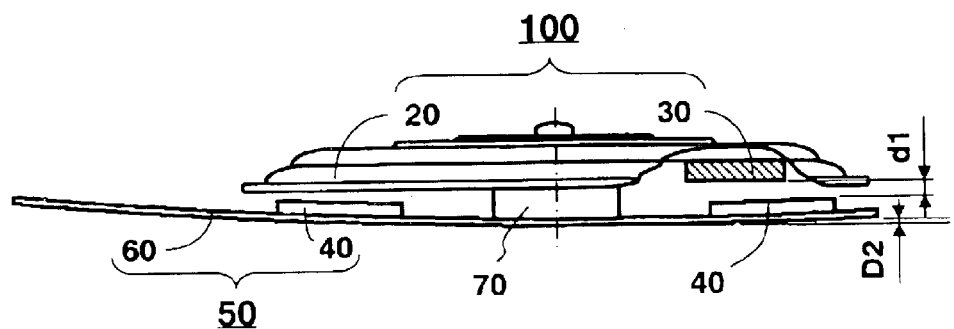
FIGS. 9(a) and 9(b) are cross-sectional views of a flat motor according to the prior art.
Figure 9B:
Figure 10:
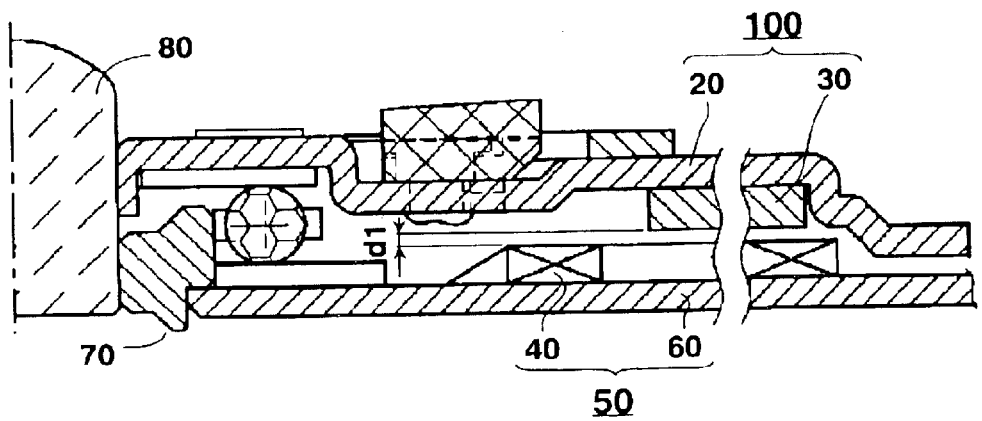
FIG. 10 is an enlarged fragmentary cross-sectional view of the flat motor shown in FIG. 9(a).

FIG. 8(a) is a graph exhibiting a result of reliability test in environment of normal temperature and humidity (25° C. and 60% RH).

Figure 8B:
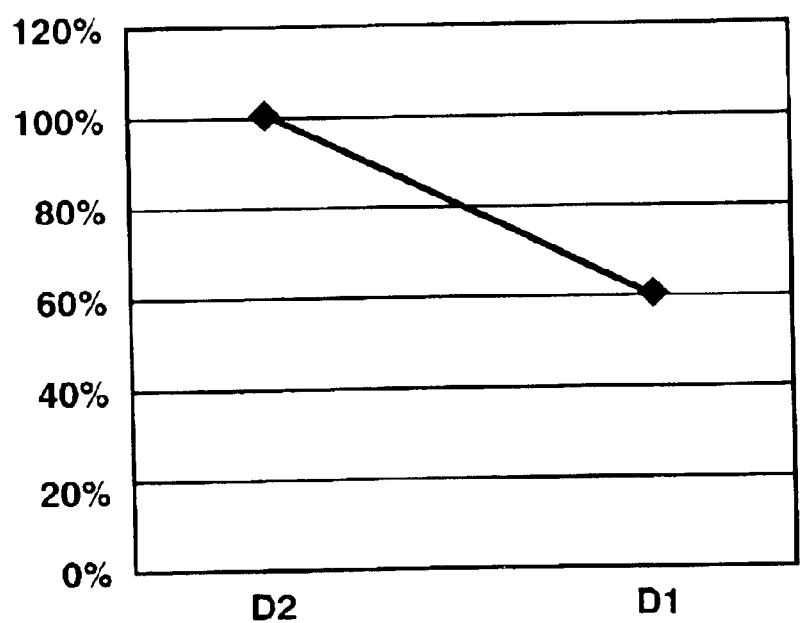

FIG. 8(b) is a graph exhibiting a result of reliability test in environment of high temperature and humidity (60° C. and 90% RH).

Figure 8C:
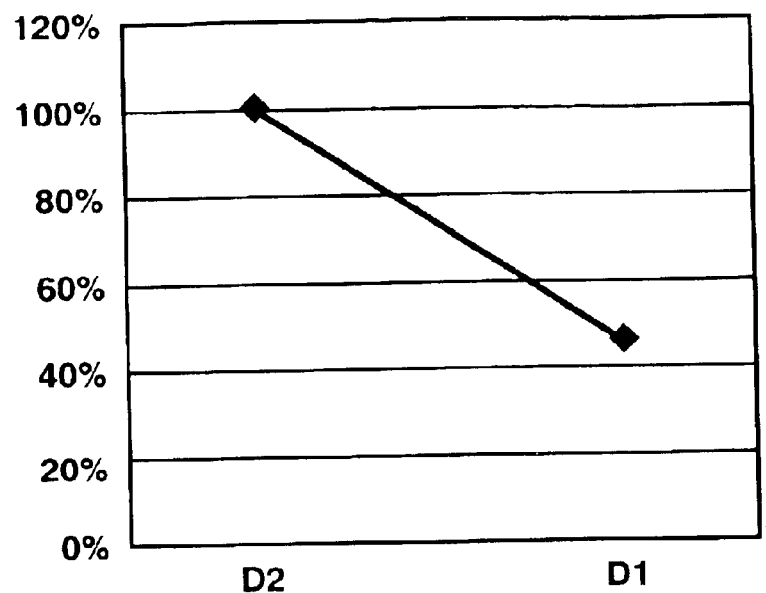

FIG. 8(c) is a graph exhibiting a result of reliability test in environment of low temperature (0° C.).

Figure 8D:
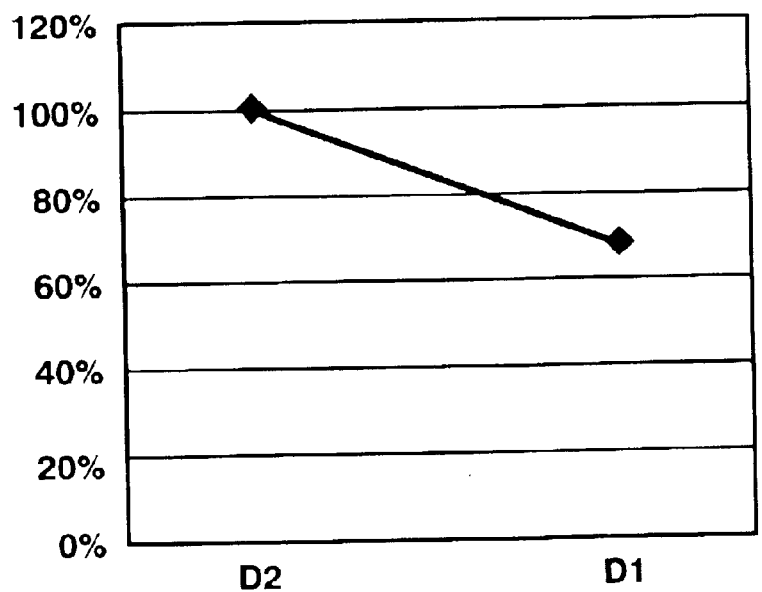

FIG. 8(d) is a graph exhibiting a result of reliability test of heat shock.

According to the reliability tests, a variation ratio of the warpage D1 of the present invention is 55% to 70% when the warpage D2 of the prior art is 100%. It is apparent that the warpage D1 is smaller than the warpage D2.

Accordingly, the flat motor according to the present invention is low in change of characteristic caused by elapsed time and excellent in reliability.

While the invention has been described above with reference to a specific embodiment thereof, it is apparent that many changes, modification and variations in materials and the arrangement of equipment and devices can be made without departing from the invention concept disclosed herein.

As detailed above, the flat motor according to the present invention is in less warpage of the stator yoke caused by suction power of the driving magnet.

Further, with respect to a gap between the driving magnet and the driving coil, difference between a gap in a near side to and another gap in a far side from the axis of revolution can be maintained lower, so that the flat motor can be made more thinner.

Furthermore, the stator yoke is high in strength and less in a ratio of shape change.

Accordingly, the flat motor of the present invention provides effects such that characteristic change in accordance with elapsed time is small and results in being excellent in reliability.

It should be understood that many modifications and adaptations of the invention will become apparent to those skilled in the art and it is intended to encompass such obvious modifications and changes in the scope of the claims appended hereto.

What is claimed is:

1. A flat motor comprising:

a rotor composed of an axis and a driving magnet in a ring shape having multipolar driving magnetic poles; and a stator yoke composed of a plane section for mounting a bearing for holding the rotor to rotate freely with centering the axis and another plane section for mounting a plurality of driving coils disposed in a concentric circle with facing towards the driving magnet, wherein the other plane section is disposed in conjugating with the outer side of the plane section, the flat motor is further characterized in that the plane section is formed flat in a circular shape with centering the axis, and the other plane section is a part of surface of approximately a circular cone shape having a vertex on the axis and is in a shape of inclining towards a direction away from the rotor in accordance with being far away from the axis and formed with a pleat by bending the stator yoke in a conjugating section between the plane section and the other plane section.

* * * * *